FIP8102 XR 2,579,571
SUBSTITUTE FOR MISSING COPY
Dec. 25, 1951 J. R. HECK 2,579,571
COMMUNICATION APPARATUS
Filed March 13, 1947
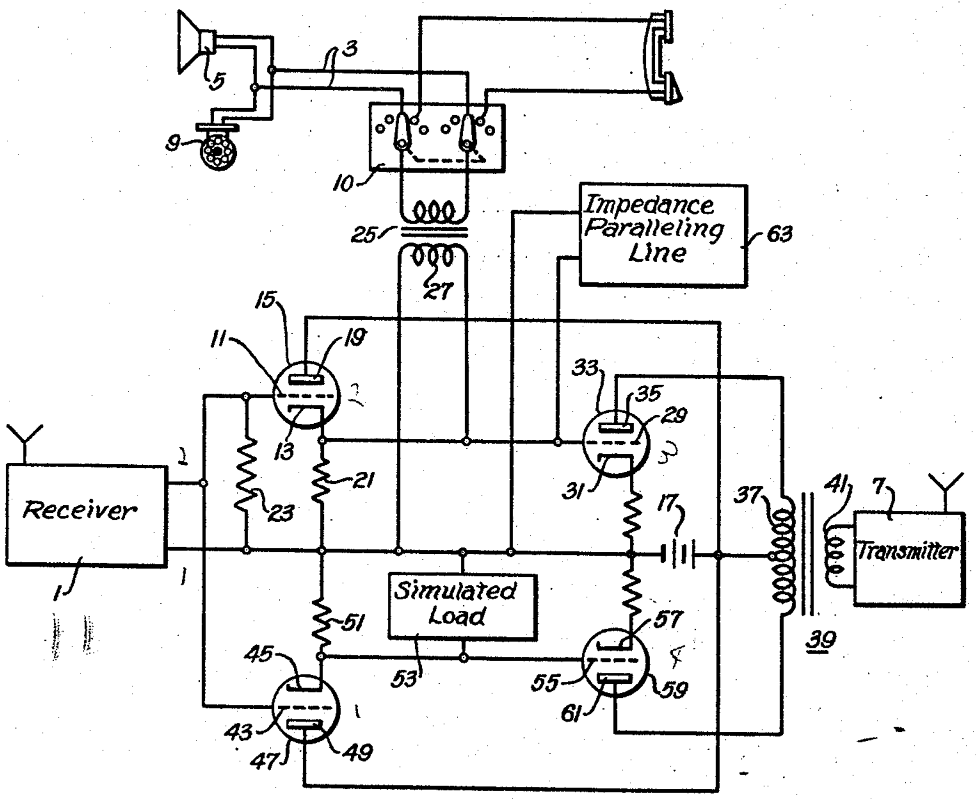
WITNESSES:
Robert C. Baird
Wm. C. Groome
INVENTOR
James R. Heck.
BY
Hyman Diamond.
ATTORNEY Patented Dec. 25, 1951 2,579,571

UNITED STATES PATENT OFFICE 2,579,571

COMMUNICATION APPARATUS

James R. Heck, Baltimore, Md., assignor to Westinghouse Electric Corporation, East Pittsburgh, Pa., a corporation of Pennsylvania Application March 13, 1947, Serial No. 734,474

15 Claims. (Cl. 178—44)

My invention relates to electric discharge apparatus and has particular relation to hybrid networks for communication apparatus.

Communication apparatus to which my invention is particularly applicable involves a line which is in communication with two or more channels. Electrical energy is transmitted to the line from one of the channels and from the line to the other channel. Specifically, such a communication system may involve a telephone line, a receiver and a transmitter. Received signals are transmitted from the receiver through the line to the loud-speaker. Signals to be transmitted are passed from a microphone on the line to the transmitter.

In systems of this type, a hybrid network is interposed between the branch channels to block the transmission of electrical energy from one of the channels to the other. Hybrid networks and related circuits of various types are illustrated in Patents 1,432,354, Nottage; 1,619,058, Crisson; 1,814,775, Urmston; 2,169,360, Kimmel; 2,197,029, Bast; and 2,282,403, Herrick.

Communication systems constructed in accordance with the teachings of the prior art of which I am aware, and of which the above-listed patents are typical, have not proved entirely satisfactory. The hybrid network is essentially a balanced network. The flow of current between the two channels connected to the hybrid circuit is suppressed if the network is maintained in proper balance. Difficulties are, however, encountered in maintaining the network balanced. A hybrid network adjusted to suppress flow of current between the channels at one time will later fail to accomplish this function, and distortions will be produced by reason of improper current flow through the network.

It is, accordingly, an object of my invention to provide a hybrid network which shall maintain its balance for a communication system.

Another object of my invention is to provide a stable network for preventing the flow of current between two branch channels which individually are connected to communicate with a line.

A further object of my invention is to provide a stable network for suppressing the flow of current between branch channels interconnected for communication purposes with a line, one of the channels to receive energy from the line and the other to transmit energy to the line.

An ancillary object of my invention is to provide a novel amplifier circuit.

More specifically stated, it is an object of my invention to provide a network for suppressing energy flow between a receiver and a transmitter which are connected to a line.

My invention arises from the realization that the instability of the hybrid network arises from variations in the impedance of the line. The line impedance varies over a wide range from time to time and as it varies, it disturbs the balance of the hybrid network. Once the network is unbalanced, substantial current flows between the branches which communicate with the line.

In accordance with my invention, I provide a hybrid network, the components of which are so connected that its balance is substantially independent of the line impedance. My invention, in its more specific aspects, contemplates the provision of a hybrid network which includes an electric discharge device having an anode, a cathode and a control electrode. The control circuit of the discharge device is supplied from the branch from which impulses flow to the line. The line is connected across an impedance interposed between the cathode and one pole of the potential from which the device is supplied. The discharge device is associated with other components in the network which are controlled from it and which effectively block the flow of current between the branches. As the line impedance varies, the current flow through the impedance between the cathode and the power supply varies. However, this variation, in turn, varies the control potential of the discharge device. The latter variation is in such a sense as to compensate for the variation in line impedance. The output current of the discharge device is thus maintained substantially uniform. Since the network is controlled in accordance with the current, the network is maintained in balance.

In accordance with the preferred practice of my invention, the impedance between the cathode and the power supply is preferably small compared with the line impedance. In certain situations, it may be of the order of 1 to 10% of the line impedance. Where the cathode impedance is small, variations in the line impedance do not materially affect the net impedance in the output circuit of the discharge device and, therefore, do not vary the current flow through the discharge device.

A hybrid network in accordance with my invention operates satisfactorily not only with a line of widely varying impedance. It may also be used at the election of an operation with one of a number of lines of widely different impedance. In such a system the lines are connected to the network through switches. To select a particular line the operator need only properly set the switches. No adjustment of the network is necessary.

The novel features that I consider characteristic of my invention are set forth with particularity in the appended claims. The invention itself, however, both as to its organization and its method of operation together with additional objects and advantages thereof will best be understood from the following description of a specific embodiment when read in connection with the accompanying drawing, in which the single figure is a diagrammatic view showing an embodiment of my invention.

The apparatus shown in the drawing comprises a receiver 1 from which signals are to be transmitted through one of a plurality of lines 3 to a loudspeaker 5 (or other device for connecting electrical energy into sound), and a transmitter 7 which is to receive signals originating at a microphone 9 on the line. The receiver 1 and the transmitter 7 are connected to one or several of the lines 3, at the will of the operator, through a switchboard 10. The output of the receiver 1 is coupled between the control electrode 11 and the cathode 13 of an electric discharge device 15 preferably of the high vacuum type. The discharge device is supplied from a potential source 17 illustrated symbolically as a battery. The anode 19 of the discharge device is connected to one terminal of the source 17, and the other terminal of the source is connected to the cathode 13 through a resistor 21. The output of the receiver is impressed across a resistor 23 connected between the control electrode and the terminal of the power supply 17 remote from the terminal to which the anode 19 is connected.

Energy flows between the line 3 and the receiver 1 and the transmitter 7 through a transformer 25, one winding 27 of which is connected across the cathode resistor 21. The cathode resistor is also connected between the control electrode 29 and the cathode 31 of a second discharge device 33. The anode 35 of the latter device is connected to the terminal of the power supply 17, to which the anode 19 is connected, through the upper section of the primary 37 of the second transformer 39. The primary 37 has a mid tap which is connected to the power supply 17.

Signals are transmitted from the line 3 through the transformer 25 between the line and the cathode resistor 21 to the control circuit of the second discharge device 33. The resultant variations produced in the output circuit of this discharge device are impressed on the primary 37 of the second transformer 39. The secondary 41 of the transformer 39 is connected to the input circuit of the transmitter 7. Signals are thus transmitted from the line 3 to the transmitter 7 through the second discharge device 33.

The output of the receiver 1 is also impressed between the control electrode 43 and the cathode 45 of a third discharge device 47 which is substantially similar to the first discharge device 15. The anode 49 of the latter discharge device is connected to the terminal of the supply 17 to which the other anodes 19 and 35 are connected, and the cathode 45 is connected through a resistor 51 similar to the first-mentioned cathode resistor 21 to the other terminal of the supply. An impedance 53, which I shall call simulated load, simulating the impedance of the line 3 is connected across the last-mentioned cathode resistor 51.

The cathode resistor 51 is also connected between the control electrode 55 and the cathode 57 of a fourth discharge device 59. The anode 61 of the latter discharge device is connected through the remaining section of the primary 37 of the transmitter transformer 39 to the terminal of the source 17 to which the other anodes 19, 35 and 49 are connected.

Signals from the receiver 1 are transmitted through the first discharge device 15 to the line 3. The variations produced across the cathode resistor 21 of the first discharge device, when signals are impressed in its control circuit, are also impressed between the control electrode 29 and the cathode 31 of the second discharge device 33. However, corresponding variations are impressed between the control electrode 55 and the cathode 57 of the fourth discharge device 59. The anodes 35 and 61 of the second and fourth discharge devices, 33 and 59 respectively, are oppositely connected to the terminals of the primary 37 of the transformer 39. Therefore, the potential variations produced at the anode 35 of the second discharge device 33, by reason of the receiver output variations, are counteracted by potential variations produced at the anode 61 of the fourth discharge device 59. The simulated load is so adjusted that the counteracting variations produced at one anode substantially annuls those produced at the other anode.

If the impedance of line 3 is of the same order of magnitude as the cathode resistance 21 of the first discharge device 15, variations in the line impedance produce variations in the current flow through the first discharge device. However, such current variations produce potential drops between the cathode 13 and the control electrode 11 of the first discharge device which tend to counteract the variations in current flow. Assume, for example, that the line impedance decreases substantially. The current flow through the resistor 21, and the other impedances in parallel with it, will, under such circumstances, increase. The potential across the resistor 21 will, accordingly, also increase causing the negative potential of the control electrode relative to the cathode to increase. Increase in the latter potential reduces the current flow through the discharge device.

The variations may further be reduced by connecting additional impedance 63 in parallel with the line 3. A further improvement is effected by providing a cathode resistor of small magnitude.

In the embodiment of my invention disclosed, the microphone 9 and loudspeaker 5 are disposed along the line. My invention is not to be restricted to such a system. For example, it may be applied to a communication system, such as is illustrated in the Herrick patent, in which the loudspeaker is disposed at the receiver and the microphone at the transmitter. In such a system, the flow of power is from the line to the receiver, and from the transmitter to the line. Where my invention is used in such a system, the receiver 1 and transmitter 7 are interchanged.

In its broader aspects, moreover, my invention is not to be limited to a system in which the conversion devices in the channels are respectively a receiver and a transmitter. Conversion devices of other types, for example meters or relays, may

EXAMINER be utilized. Moreover, the cathode resistors may be replaced by impedances of other types, such as reactors, or capacitors, or combinations of reactors, capacitors and resistors. In certain applications of my invention, one or more of the discharge devices 15, 33, 47 or 59 may be of the gaseous type. Such a situation may arise where the energy to be transmitted is produced by keying or where relay impulses are communicated. One or more of the discharge devices 15, 33, 47 or 59 may also be of the multi-electrode type rather than the three electrode type. Several of the discharge devices may be included in a single envelope. One or more of the discharge devices 15, 33, 47 or 59 may also be diodes. If the devices 15 and 47 or both are diodes, the cathode resistors 21 and 51 are connected between the cathodes and the potential source from which the diodes are supplied. The source 17 shown as a battery may in any of the systems discussed above be an alternating current supply or a plurality of alternating current supplies.

My invention is not to be restricted except insofar as is necessitated by the prior art and by the spirit of the appended claims.

I claim as my invention:

1. In a communication system including a transmitter, a receiver and a line to which signals received by the receiver are supplied and from which signals to be transmitted by the transmitter are derived, the combination comprising a first electrical path including an electric discharge device, said electric discharge device having an input circuit and an output circuit including an anode, a cathode, means for supplying potential and an impedance connected between said cathode and said potential supply means, means for coupling the output of said receiver to said input circuit, means for impressing the potentials produced across said impedance on said line, a second electrical path, means including said impressing means, for passing signals derived from said line to said transmitter over said second path, and a third electrical path coupled to said first and second paths for suppressing the flow of signals from said receiver to said transmitter through said impressing means.

2. In a communication system including a line, a first converter from which electrical energy is supplied to said line and a second converter to which electrical energy derived from said line is transmitted the combination comprising a first electrical path including an electric discharge device having an input circuit and an output circuit including an anode, a cathode, means for supplying a potential and an impedance connected between said cathode and said potential-supply means, means for coupling the output of said first converter to said input circuit, means for impressing the potentials produced across said impedance on said line, a second electrical path, means including said impressing means, for passing electrical variations derived from said line to said second converter over said second path and a third electrical path coupled to said first and second paths for suppressing the flow of electrical energy from said first converter to said second converter through said impressing means.

3. In a communication system including a line, a first converter from which electrical energy is supplied to said line and a second converter to which electrical energy derived from said line is transmitted; the combination comprising a first electrical path including an electric discharge device having an input circuit and an output circuit including an anode, a cathode, means for supplying a potential and an impedance connected between said cathode and said potential supply means, means for coupling the output of said first converter to said input circuit, means for impressing the potentials produced across said impedance on said line, a second electrical path, including an electric discharge device having input and output circuits, means for coupling the output of said line to said last-mentioned input circuit means for coupling said last-mentioned output circuit to the input of said second converter, and a third electrical path coupled to said first and second paths for suppressing the flow of electrical energy from said first converter to said second converter through said impressing means.

4. In a communication system including a line, a first converter from which electrical energy is supplied to said line and a second converter to which electrical energy derived from said line is transmitted; the combination comprising a first electrical path including an electric discharge device having an input circuit and an output circuit including an anode, a cathode, means for supplying a potential and an impedance of small magnitude compared to the impedance of said line connected between said cathode and said potential supply means, means for coupling the output of said first converter to said input circuit, means for impressing the potentials produced across said impedance on said line, a second electrical path, means including said impressing means, for passing electrical variations derived from said line to said second converter over said second path and a third electrical path coupled to said first and second paths for suppressing the flow of electrical energy from said first converter to said second converter through said impressing means.

5. In a communication system including a line, a first converter from which electrical energy is supplied to said line and a second converter to which electrical energy derived from said line is transmitted; the combination comprising a first electrical path including an electric discharge device having an input circuit and an output circuit including an anode, a cathode, means for supplying a potential and a resistance of small magnitude compared to the impedance of said line connected between said cathode and said potential supply means, means for coupling the output of said first converter to said input circuit, means for impressing the potentials produced across said impedance on said line, a second electrical path, means including said impressing means, for passing electrical variations derived from said line to said second converter over said second path and a third electrical path coupled to said first and second paths for suppressing the flow of electrical energy from said first converter to said second converter through said impressing means.

6. In a communication system including a line, a first converter from which electrical energy is supplied to said line a second converter to which electrical energy derived from said line is transmitted, the combination comprising a first electrical path including an electric discharge device having an input circuit and an output circuit, said path being of the type wherein the current flow through said output circuit is substantially independent of the load supplied by said discharge device, means for coupling the output of said first converter to said input circuit, means for coupling said output circuit to said line, a second electrical path, means including said last-mentioned coupling means, for passing electrical variations derived from said line to said second converter over said second path and a third electrical path coupled to said first and second paths for suppressing the flow of electrical energy from said first converter to said second converter through said second-mentioned coupling means.

7. In a communication system including a line, a first converter from which electrical energy is supplied to said line and a second converter to which electrical energy derived from said line is transmitted, the combination comprising a first electrical path including an electric discharge device having an input circuit and an output circuit, said path being of the type wherein the current flow through said output circuit is substantially independent of the load supplied by said discharge device, means for coupling the output of said first converter to said input circuit, means for coupling said output circuit to said line, a second electrical path, means including said last-mentioned coupling means, for passing electrical variations derived from said line to said second converter over said second path, a third electrical path coupled to said first and second paths for suppressing the flow of electrical energy from said first converter to said second converter through said second-mentioned coupling means, and impedance means connected in parallel with said line.

8. In a communication system including a line, a first converter from which electrical energy is supplied to said line and a second converter to which electrical energy derived from said line is transmitted; the combination comprising a first electrical path including an electric discharge device having an input circuit and an output circuit including an anode, a cathode, means for supplying a potential and an impedance connected between said cathode and said potential supply means, means for coupling the output of said first converter to said input circuit, means for impressing the potentials produced across said impedance on said line, a second electrical path, means including said impressing means, for passing electrical variations derived from said line to said second converter over said second path and a third electrical path coupled to said first and second paths for suppressing the flow of electrical variations from said first converter to said second converter through said impressing means, said third path including a second electric discharge device, substantially similar to said first-named electric discharge device and having an input circuit and an output circuit including an anode, a cathode, means for supplying a potential and a second impedance connected between said last-named cathode and said potential supply means, a dummy load simulating the load imposed by said line on said first-named electric discharge device connected across said second impedance and means for coupling said second impedance to said second path in such manner that the electrical energy across said second impedance substantially balances out the electrical energy from said first-named impedance impressed on said second path.

9. In a communication system including a line, a first converter from which electrical energy is supplied to said line and a second converter to which electrical energy derived from said line is transmitted; the combination comprising a first electrical path including an electric discharge device having an input circuit and an output circuit including an anode, a cathode, means for supplying a potential and an impedance connected between said cathode and said potential supply means, means for coupling the output of said first converter to said input circuit, means for impressing the potentials produced across said impedance on said line, a second electrical path, including a second electric discharge device having input and output circuits, means including said impressing means, for coupling said line to said last-named input circuit, means for coupling said last-named output circuit to said converter, a third electrical path including a third electric discharge device having an input circuit and an output circuit including an anode, a cathode and said potential supply means, a second impedance connected between said cathode and said source of potential, means for coupling the output of said first converter to said last-named input circuit, means for connecting a dummy load simulating said line impedance, across said second impedance, a fourth electrical path including a fourth electric discharge device having input and output circuits, means for coupling said second impedance to said last-named input circuit and means for coupling the output circuit of said fourth discharge device in opposite phase to the output circuit of said second discharge device.

10. A circuit for connecting a two-wire line to a four-wire system comprising a first branch over which electrical energy is supplied to said line and a second branch over which electrical energy is derived from said line; said circuit comprising a pair of electric discharge devices each having a pair of principal electrodes and a control electrode, potential supply means having terminals of opposite polarity, means for connecting said first branch between said control electrodes and one of said terminals, means for connecting one of said principal electrodes of each of said discharge devices to another of said terminals, a first impedance connected between the other of said principal electrodes of one of said discharge devices and said one of said terminals, a second impedance connected between the other of said principal electrodes of the other of said discharge devices and said one of said terminals, means for connecting said two-wire line across said first impedance, means for connecting a dummy load simulating the two-wire line impedance across said second impedance, a second pair of electric discharge devices each having a control electrode and a plurality of principal electrodes, means for connecting said two-wire line between one of the principal electrodes and the control electrode of one of said last-named pairs of devices, means for connecting said dummy load between one of the principal electrodes and said control electrode of the other of said last-named pair of devices and means for coupling said other principal electrodes of said last-named discharge devices to opposite poles of said second branch.

11. In combination a first electric discharge device having a control electrode, an anode and a cathode, a second electric discharge device having a control electrode, an anode and a cathode, potential supply terminals, means for connecting one of said terminals to both said anodes, a first impedance connected between the cathode of said first device and another of said terminals, a second impedance connected between the cathode of said second device and said other of said termi-

EXAMINER nals, means for impressing potentials between said control electrode and the other of said terminals, a third impedance having an intermediate tap and terminals taps, means for connecting said intermediate tap to said one potential supply terminal, a third electric discharge device having an anode, a cathode and control electrode, means for connecting said last-named anode to one of said terminal taps, means for connecting said control electrode to the cathode of said first discharge device, means for connecting said cathode of said third device to said other potential supply terminal, a fourth electric discharge device having an anode, a cathode and a control electrode, and means for connecting said last-named anode to another terminal tap, said last-named control electrode to the cathode of said second device and the cathode of said fourth device to said other potential supply terminal.

12. In apparatus for transferring energy from a first branch channel to a line and from the line to a second branch channel; the combination comprising a first electric discharge device having input and output circuits, means for coupling said first branch channel to said input circuit, means for coupling said line to said output circuit, a second electric discharge device having input and output circuits, means for coupling said line to said last-named input circuit, means for coupling said second channel to said last-named output circuit, a third electric discharge device having input and output circuits, means for coupling said first channel to said last-named input circuit, means for coupling a dummy load simulating said line to said last-named output circuit, a fourth electric discharge device having input and output circuits, means for coupling said dummy load to said last-named input circuit and means for coupling said last-named output circuit to said second channel in opposite phase to the output circuit of said first-named discharge device.

13. Apparatus according to claim 12 in which the output circuit of the first discharge device is an impedance in the return conductor from its cathode.

14. Apparatus according to claim 12 in which the output circuits of the first and third discharge devices are impedances in the return conductor from their cathodes.

15. In a system including a plurality of lines, certain of which are selectable at the will of the operator, a first converter from which electrical energy is supplied to said line and a second converter to which electrical energy derived from said line is transmitted; the combination comprising a first electrical path including an electric discharge device having an input circuit and an output circuit including an anode, a cathode, means for supplying a potential and an impedance connected between said cathode and said potential-supply means, means for coupling the output of said first converter to said input circuit, means for impressing the potentials produced across said impedance on said line, a second electrical path, means including said impressing means, for passing electrical variations derived from said line to said second converter over said second path and a third electrical path coupled to said first and second paths for suppressing the flow of electrical energy from said first converter to said second converter through said impressing means.

JAMES R. HECK.

REFERENCES CITED

The following references are of record in the file of this patent:

UNITED STATES PATENTS

| Number | Name | Date | |
|---|---|---|---|
| 1,858,307 | Nyquist | May 17, 1932 | 178-44.14 |
| 2,129,990 | Fremery | Sept. 13, 1938 | 179-170D |
| 2,169,360 | Kimmel | Aug. 15, 1939 | 178-44.14 |
| 2,197,029 | Bast et al. | Apr. 16, 1940 | 179-170D |
| 2,313,122 | Brubaker | Mar. 9, 1943 | 179-171.1A |
| 2,324,279 | Clark | July 13, 1943 | 179-171.1A |